United States Patent

Hirs

[11] 4,048,068
[45] Sept. 13, 1977

[54] METHOD OF AND APPARATUS FOR FILTERING

[75] Inventor: Gene Hirs, Livonia, Mich.

[73] Assignee: Amsted Industries, Inc., Chicago, Ill.

[21] Appl. No.: 432,010

[22] Filed: Jan. 9, 1974

[51] Int. Cl.$^2$ ............................................. B01D 29/08
[52] U.S. Cl. ........................................ 210/80; 210/82; 210/284; 210/290
[58] Field of Search ................. 210/80, 82, 263, 275, 210/284, 290, 317, 333, 335, 65

[56] References Cited

U.S. PATENT DOCUMENTS

| | | | |
|---|---|---|---|
| 3,171,801 | 3/1965 | Rice et al. | 210/80 |
| 3,171,802 | 3/1965 | Rice et al. | 210/290 |
| 3,343,680 | 9/1967 | Rice et al. | 210/263 |
| 3,382,983 | 5/1968 | Stewart | 210/290 |
| 3,680,701 | 8/1972 | Holca | 210/80 |
| 3,701,423 | 10/1972 | Lindstol | 210/80 |
| 3,780,861 | 12/1973 | Hirs | 210/80 |

Primary Examiner—Wilbur L. Bascomb, Jr.
Assistant Examiner—Ivars Cintins
Attorney, Agent, or Firm—Cullen, Settle, Sloman & Cantor

[57] ABSTRACT

A method of and apparatus for filtering, including a plurality of separate filter media beds progressively decreasing in granular media size in the direction of filtration flow. One embodiment of the invention includes two separate media beds comprised of two intimately contacting granular layers of different granular size. A second embodiment of the invention includes three separated media beds. In this embodiment the first bed consists of a single media layer and the second and third beds are comprised of two intimately contacting media layers of different granular size. In both embodiments, the filtration flow rate through each successive separate bed is less than that in the immediately preceeding bed. The overall arrangement of the present invention reduces accumulation of contaminants at the surface of each filter bed and at the interface between media layers, is capable of accommodating contaminant overload conditions, and eliminates the reverse stratification problem normally encountered during and after backwash procedures.

7 Claims, 2 Drawing Figures

METHOD OF AND APPARATUS FOR FILTERING

BACKGROUND OF THE INVENTION

The state of the art pertaining to filtration of liquids through a bed of granular filter media has progressed considerably over the past fifteen years. The concept of multimedia deep bed filters (or in-depth filters) in a well known art. Also it is commonly known that arranging layers of granular media from the coarsest to the finest produces the most efficient filter operation. Filtering liquids through a series of deep bed filter layers has been disclosed un U.S. Pat. Nos. 3,171,801, 3,171,802, 3,701,423 and 3,680,701. A multiplicity of filter media combinations has been suggested, for example in U.S. Pat. No. 3,343,680, as including combination of anthracite, sand, garnet, plastics, and activated carbon.

In spite of all the advancements that have been made, the prior art does not set forth solutions to many of the more troublesome problems of liquid filtration, particularly those associated with filtration of industrial and municipal waste water. For instance, it is commonly known that most any suspended contaminant can be removed from a liquid by filtering through a bed of granular filter media, provided the granules are fine enough and the bed is deep enough. However, a high pressure drop across the filter bed and frequent backwashings often make such "super" filters economically impracticable.

Filters are also often subjected to emergency or peak load conditions. Without providing for an overdesigned filter or auxiliary filter to handle peak loads, deep bed filters of the prior art simply cannot contend with most emergency or peak load conditions. In many municipal and industrial waste treatment facilities upset conditions may occur from time to time. Suspended solids carried to a filter during an upset condition will be so great so to often render a deep bed filter totally inoperable.

Attempting to solve these prior art problems by simply employing a filter bed having a number of filter layers creates even more problems. For example, practical considerations foil attempts to design filters which meet the large to fine granule gradation. Using material of the same specific gravity will produce a reverse fine-to-large gradation after the filter bed has been backwashed. Up-flow filters are designed to circumvent this problem, but these filters have definite limitations as to minimum size of finer filter media and as to overall flow rate.

The reverse gradation problem has been solved with a certain degree of success by using materials of differing specific gravities. The upper and coarser filter media is comprised of a lighter weight material such as anthracite coal. The successive layers are comprised of increasingly more dense materials. An example of such a combination would be a top layer of anthracite, an intermediate layer of sand and a bottom layer of garnet. This and other combinations are discussed in U.S. Pat. No. 3,343,680.

However, with the use of material of differing specific gravities there is a practical limitation on the size of the largest filter media that can be used. Even with materials of such different specific gravities as coal and sand, if the granules of coal are large enough they will tend to stratify at lower levels within a multimedia filter bed. And it is such larger granules that are needed to handle the conditions of heavy dirt loads with peak or upset conditions at waste treatment plants.

The device shown in U.S. Pat. No. 3,680,701 attempts to solve this problem by separating the larger and finer filter media into separate beds. However, simply separating the various grades of filter media into individual beds is not the answer to handling varying filtration conditions.

The present invention overcomes the previously stated problems of prior art devices by the provision of a plurality of physically separated filtration vessels which are interconnected by fluid flow conduits. Each vessel houses either one or a plurality of layers of granular filter media in an arrangement such that the granular media becomes finer in the direction of filtration flow. Further, each vessel is designed to successively reduce filtration flow rate. With such an arrangement, improved filtration of liquids is accomplished, varying contaminant loads can be accommodated, and reverse stratification of filter media during backwash procedures is substantially eliminated.

DEFINITION AND EXPLANATION OF TERMS

For purposes of simplifying designations of filter media sizes, all references herein to a particular "mesh" or "mesh size" refer to U.S. Standard Mesh Sieve size. A designation of a mesh size preceded by a minus (−) sign indicates that all granules will pass that size sieve. A designation of mesh size preceded by a plus (+) sign indicates that all granules will be retained on that size sieve. For example, a mixture of granular filter media designated +8 to +30 mesh means all the granules will pass a No. 8 U.S. Standard Mesh Sieve and all the granules will be retained on a No. 30 U.S. Standard Mesh Sieve. Stated another way, all the granules are smaller than a No. 8 sieve and larger than a No. 30 sieve.

"Average size of filter media" is defined as a mathematically derived figure equal to the sum of the individual products of the fraction by weight of each mesh size in a layer of media multiplied by the respective mesh sizes. For example, in a filter bed consisting of a layer of granulated black walnut shells, having 40% by weight of 6 mesh granules and 60% by weight of 8 mesh granules, and a layer of granulated anthracite coal, having 20% by weight of 6 mesh, 30% by weight of 8 mesh, and 50% by weight of 16 mesh granules, the "average size of filter media" in the respective layers is 7.2 mesh (.40 × 6 mesh + .60 × 8 mesh = 7.2mesh) and 11.6 mesh (.20 × 6 mesh + .30 × 8 mesh + .50 × 16 mesh = 11.6 mesh).

References herein to a "distinct" layer of filter media are intended to mean a body of filter material situated in layer fashion so that a substantial part of this material is at a different layer level than a preceding or succeeding layer of filter media. This does not mean that some intermixing of granules of different layers will not occur, since, as a practical matter, there will always be some mixing at the interface of contacting layers.

SUMMARY OF THE INVENTION

The present invention relates to an improved filtration method and apparatus, and more particularly to a series of communicating filtration vessels and filtration media layers.

It is an object of the present invention to provide a series of deep bed filters which will give improved filtration of liquids. It is a further object of the invention to provide a liquid filter apparatus and method to handle varying loads of suspended contaminants flowing into the filter. It is yet a further object of the invention to adequately filter liquids in waste treatment facilities during upset conditions.

Very simply defined the present invention consists of four or more distinct layers of granular filter media situated in two or more separate filter beds. The first bed is comprised of one or more layers of filter media, and the following filter beds are each comprised of two or more layers of granular filter media. The filter beds are in series but not in direct contact with each other. Contaminated liquid flows successively downwardly through the first bed, through an appropriate conduit means to the second bed, downwardly through that bed and then to and through any further filter beds.

The filter media is successive layers in the direction of filter flow begins with the coarsest material and becomes successively finer from layer to layer. The average size of the filter media decreases from layer to layer in the direction of filter flow. The filtration flow rate per square foot of filter bed inlet area also successively decreases in the filter beds in the direction of filtration flow due, for example, to an increase in width of successive filter beds.

The filter is designed to handle the changes in flow rate and dirt load that often exist in the treatment of municipal and industrial wastes. Ideally, filter media should begin with very coarse granules and gradually reduce in size to finer and finer granules. Such an arrangement entraps the largest contaminants first and successively entraps smaller particles as contaminated liquid passes through the finer granular layers. Quite unexpectedly, such an arrangement also best handles sudden changes in flow rate and increases of suspended solids.

It has been found that a balance must be reached to arrive at an ideal filter apparatus and method. It has been determined that at least four distinct layers of filter media must be provided from the coarsest to the finest media. Jumping from very coarse media to fine media as in U.S. Pat. No. 3,680,701 does not provide a gradual engough reduction of filter media granules to keep filter surface loading under control. It has been further determined that the various layers of filter media must be separated into two or more separate beds. This permits the use of the largest effective granule filter media as a primary filter layer without encountering reverse stratification during backwash procedures.

Except for the very largest filter media, it has been determined that the layers of filter media must be arranged into groups of two or more layers in each separate filter bed. This accomplishes an interface mixing where the layers come into contact and keeps surface loading to a minimum when passing from layer to layer. It is vitally important that each layer be comprised of granules of an average size greater than any following layer. This ensures selective entrapment of dirt particles from the largest to the smallest, provides for deepest possible penetration of dirt into each layer of filter media, and results in greatest filtration efficiency.

Larger dirt particles require a greater driving force to accomplish desired penetration in the filter media. To realize this penetration, it has been found that the filtration flow rate through the coarser filter media beds must be greater than that of the finer filter media.

Further advantages of this invention and distinctions from the prior art will become apparent from the more detailed description set forth below.

DETAILED DESCRIPTION OF THE INVENTION

Figure 2:
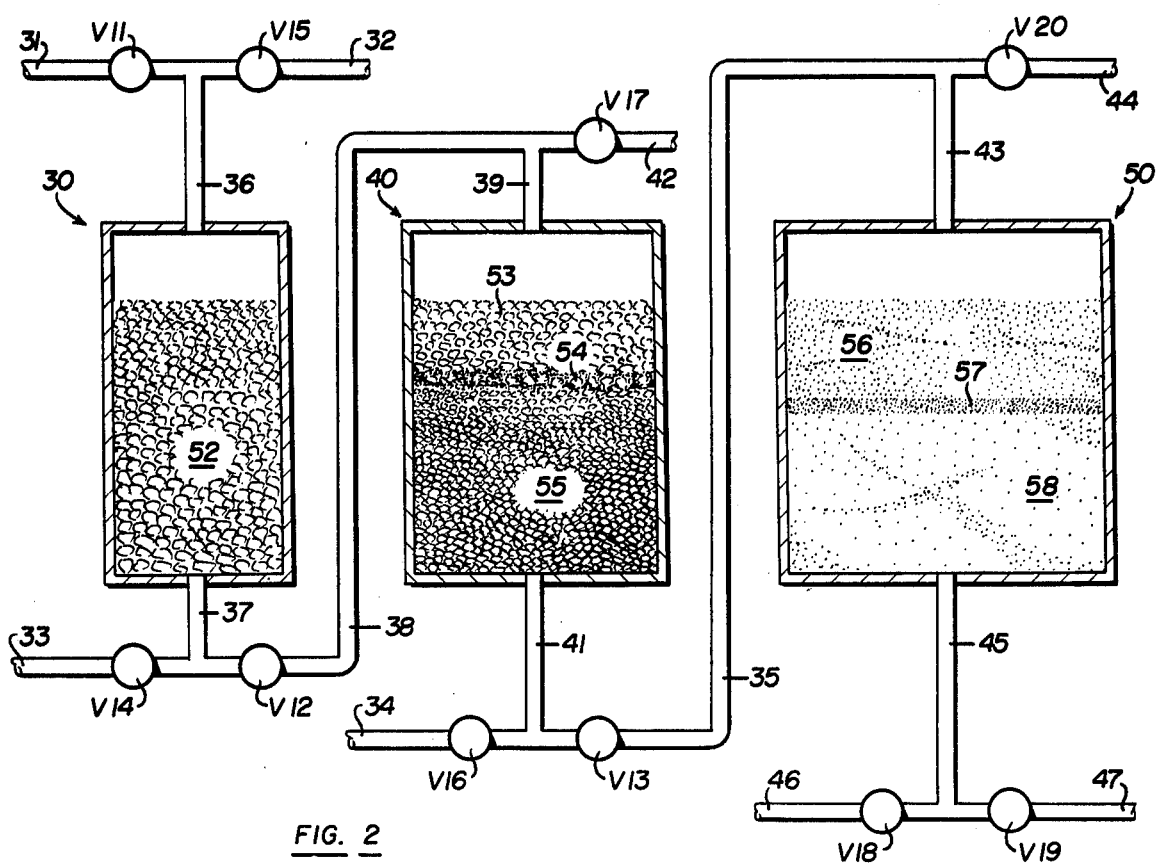
FIG. 2 is a schematic representation of the present invention comprising three filter beds with the first filter bed consisting of a single filter medium and the second and third beds consisting of two filter media in distinct layers.

As shown in FIG'S 1 and 2, filter beds 10 and 30 and filter beds 20 and 40, respectively, are arranged to be separate and distinct and not to be in intimate contact. Filter beds 10 and 30 are the preliminary or roughing filters and are comprised of two (or one as shown in FIG. 2) layers of filter media. These layers of filter media 23 and 25 (and especially layer 52 and in FIG. 2) consist of granular material of a relatively large grain size. Reference numeral 24 indicates an interface region where layers 23 and 25 contact. This interface mixing of granules from each layer minimizes contaminant surface loading which can blind off lower layer 25 and prematurely require backwashing.

Figure 1:
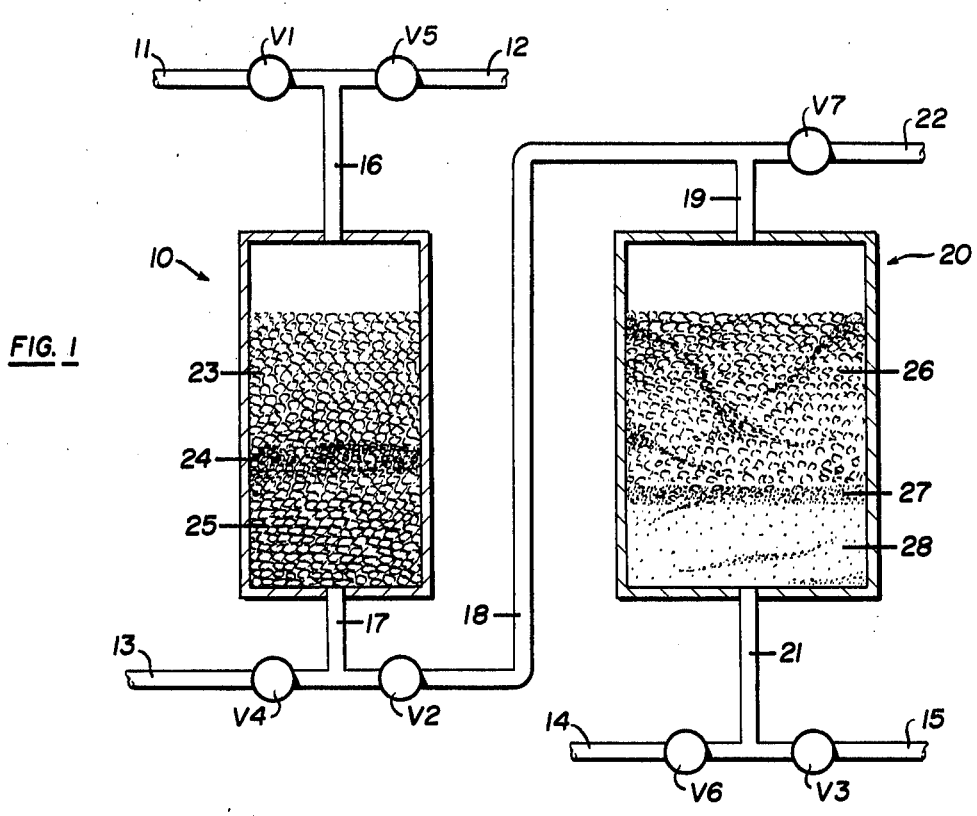
FIG. 1 is a schematic representation of the present invention comprising two filter beds wherein the first and second filter beds consist of two filter media in distinct layers.

The first filter beds with their coarse filter media are designed to perform a roughing filtration operation. They can handle tough, large flocs as well as stringy and lint-like suspended contaminents that "blind off" most deep bed filters. Referring to FIG. 1, filter medium 23 is preferred embodiment is comprised of granulated shells of black walnuts in the size range of −6 to +10 mesh. The comparable medium 52 shown in FIG. 2 is an even larger size. In preferred embodiment filter medium 52 is No. 3 anthracite coal which is three-sixteenth inch to five-sixteenth inch in size. The lower layer 25 in FIG. 1 in preferred embodiment consists of granules of anthracite coal having size range of −8 to +16 mesh.

The layers of filter media of filter beds 20 and 40 consist of finer granule material and may or may not consist of entirely different materials from the first bed. In the embodiment of FIG. 1 the layer of filter media 26 consists of granulated anthracite coal in the size range of −8 to +30 mesh to accomplish a decrease in the "average size of filter media" in the direction of filtration flow, as discussed previously. The lower layer of filter media 28 consists of the finest granules of filter media of all of the layers of material, and in preferred embodiment consists of sand in a size range of −30 to +40 mesh. Reference numeral 27 indicates the interface mixing of granules from layers 26 and 28.

Referring to FIG. 2, filter media layers 53 and 55 in preferred embodiment are identical to layers 23 and 25 of FIG. 1 i.e., −6 to +10 mesh black walnut shells and −8 to +16 mesh anthracite, respectively. Thus, the filter of FIG. 2 is designed to handle extremely heavy upset and overload conditions with its very coarse filter medium 52 and intermediate roughing filter media 53 and 55. Reference numeral 54 indicates the interface mixed region similar to region 24.

Filter bed 50 to FIG. 2 corresponds in its polishing function to filter bed 20 of FIG. 1. Filter media layers 56 and 58 are identical in composition to layers 26 and 28, i.e., −8 to +30 mesh anthracite and −30 to +40 mesh sand, respectively. Interface region 57 is similar in composition and function to region 27.

These filters operate such that flow is from top to bottom through the preliminary roughing filters 10 and 30 and then downwardly through the secondary or polishing filters 20 and 40, and as in FIG. 2 downwardly through tertiary or final polishing filter 50.

An important feature of the present invention is the arrangement of successive layers of filter medium such that the average size of granules of filter medium in any layer is greater than the average size in any successive layer in the direction of filter flow, regardless of whether such successive layer is in the same filter bed or in another filter bed. This arrangement results in greatest filtration efficiency by minimizing surface loading of any given filter bed, by promoting penetration of dirt particles into a filter bed.

Thus in the configuration of FIG. 1 the average size of filter medium decreases progressively in the direction of flow, that is, 23 is greater than 25, 25 than 26, and 26 than 28. In FIG. 2 in order to decreasing average size of filter medium the listing is 52,53,55,56, and 58.

A further important feature of the present invention is the separation of filter bed 10 from filter bed 20 and filter beds 30 and 40 from filter bed 50. This separation permits the use of filter media in bed 10 of a granule size much larger than is permitted in prior art multimedia filters wherein the various layers of filter media are in successive intimate contact. In FIG. 1, if the large granule material of layer 23 and 25 were in contact with bed 20, the filter media would have a tendency to orient itself at a lower part of the filter bed after backwashing. This would result from the fact that this filter media is much coarser than the lower and finer filter media and would tend to settle or stratify at a lower level during the backwash cycle. This is especially so with layer 52 of FIG. 2. With the primary filter media being so very coarse, this would occur even through the finer filter media is comprised of a material having a greater specific gravity. By separating the coarser granule material into its own filter bed 30 the problem of reorientation or stratification is avoided.

The use of a separate and distinct filter bed for the primary or roughing filter media has an additional advantage. The purpose of filter beds 10 and 30 is to perform a roughing filter operation on the contaminated liquid passing through the filter. What is removed is primarily larger suspended dirt particles, hairlike contaminants, large flocs, stringy and pulp-like material. Such material is more easily entrapped in the filter media than finer dirt particles. In fact, without the benefit of the larger granule primary filter media of which filter beds 10 and 30 are comprised, the stringy and pump-like contaminants would very quickly blind off a conventional deep bed filter.

To enhance the filtration characteristics of filter beds 10 and 30 it is necessary to drive the stringy and pulp-like contaminants as deeply into the filter bed as possible. Otherwise, the surface of the roughing filter would be quickly blinded by the accumulation of contaminants. In the present invention this is accomplished by maintaining a flow of contaminated liquid per square foot of filter cross sectional area through filter beds 10 or 30 at a flow rate greater than that through filter beds 20, or 40, respectively, and that through bed 40 greater than through bed 50. This is graphically depicted in FIGS. 1 and 2 by the relative widths of filter beds 10 and 20, and 30, 40 and 50. In preferred embodiment the filter flow rate through filter bed 10 is twice that through filter bed 20 for the configuration of FIG. 1. In the embodiment of FIG. 2 the flow rate through beds 30 and 40 is three times and twice, respectively, of that through bed 50. This feature has added importance since reduced flow rates in successive layers is desirable so that the smaller contaminants will not be drive through these layers by a high flow rate driving force.

Referring to FIG. 1, when contaminated liquid is being filtered valves V4, V5, V6 and V7 are closed, while valves V1, V2, and V3 are opened. The contaminated liquid flows through lines 11 and 16, downwardly through filter bed 10, through lines 17,18 and 19, downwardly through filter bed 20, and through lines 21 and 15, from which point it is discharged as treated liquid, or put into storage, or reused. This filtration cycle continues until either bed 10 or 20 becomes so clogged with contaminants as to render filtration operation inefficient. This condition can be detected either by effluent clarity or by the pressure drops across the respective filter beds. At this point, valves V1, V2 and V3 are closed and valves V4, V5, V6 and V7 are opened either manually or automatically.

Backwash liquid for filter bed 10 flows through lines 13 and 17 and upwardly through filter bed 10 and out through lines 16 and 12 for disposal or further treatment of backwash liquid and concentrate of contaminants. The coarse filter media in filter bed 10 would generally require a backwash flow rate on the order 30 gallons per minute per square foot of filter media inlet area. Similarly, backwash liquid for filter bed 20 flows through lines 14 and 21 and upwardly through filter bed 20 and out through lines 19 and 22 for disposal or further treatment of the backwash liquid and contaminant concentrates. The normal backwash flow rate through filter bed 20 would be on the order of 15 gallons per minute per square foot of filter media inlet area. A lesser backwash flow rate is required here because the filter media granules are of a smaller size. It is also possible to backwash both filter beds 20 and 10 from one source of backwash liquid by opening valves V6, V2, and V5 and closing all other valves. The backwash liquid would then flow through lines 14 and 21 upwardly through filter bed 20, out through lines 19,18 and 17, upwardly through bed 10 and out through lines 16 and 12.

Operation of the embodiment of FIG. 2 would be similar. During filtration valves V11, V12, V13 and V19 are open and all other valves closed. Filtration flow is through line 31,36,37,38,39,41,35,43,45 and 47, downwardly through each filter bed 30, 40, and 50. During individual backwash of filter beds, valves V11, V12, V13 and V19 are closed and all other valves opened. Backwash flow for beds 30 and 40 would be similar to that previously described for beds 10 and 20 of FIG. 1. Backwash flow for bed 50 would be through lines 46 and 45, upwardly through bed 50 and out through lines 43 and 44.

Referring to FIG. 1, preferred filtration flow rate per square foot of filter media inlet area for polishing filter bed 20 would be on the order of 7 ½ to 10 gallons per minute. Ordinary flow rate through roughing filter bed 10 would be on the order of 15 to 20 gallons per minute per square foot of filter bed inlet area. It would be expected that normal operating conditions would exist wherein the contaminated liquid entering filter bed 10 would be on the order of 10 to 35 parts per million of suspended solids. With the primary filter bed 10 consisting of 12 inches of black walnut shells on top of 3 feet of anthracite and the polishing filter bed 20 consisting of approximately 3 feet of anthracite on top of 1 foot of sand, in the preferred mesh range sizes mentioned above, the effluent clarity would be on the order of less than 10 parts per million of suspended solids. If it were desired to improve the quality of effluent to less than 5 parts per million, a slight addition on the order of 0.05 parts per million of filter aid polyelectrolyte should be added to the contaminated liquid prior to its entry into filter bed 10.

Peak load conditions often occur at many waste treatment facilities utilizing deep bed filters. During such peak periods the contaminated liquid upon entering filter bed 10 would contain approximately 15 to 50 parts per million of suspended solids. To attain an effluent quality of better than 10 parts per million it would be necessary to add approximately 0.05 parts per million of filter aid polyelectrolyte to the contaminated liquid prior to any filtration. If the effluent quality is desired to be at a level below 5 parts per million of suspended solids, it would be necessary to add approximately 0.1 parts per million of filter aid polyelectrolyte. During peak flow conditions the flow through the polishing filter could be raised to 15 to 20 gallons per minute, and the corresponding flow through the roughing filter could be on the order of 30 to 40 gallons per minute per square foot of filter inlet area.

The present invention can also be employed to effectively treat an upset condition that might exist at an industrial or municipal sewage treatment facility. During an upset condition the suspended solids coming to filter bed 10 could be on the order of 300 to 1,000 parts per million. This would require additional filter aid polyelectrolyte on the order of 0.5 to 2.0 parts per million to be added to the contaminated liquid. This abnormal load condition of an upset would be primarily handled by the roughing filter 10, though there would be some additional load on the polishing filter 20. Effluent quality would be on the order of 20 to 50 parts per millions of suspended solids.

Although preferred embodiments of the invention has been described above in order to provide an example which can be followed by those skilled in the art, it is to be understood that various innovations and changes can be made in the described invention without departure from the basic principles underlying the invention.

Having fully described the present invention, I claim:

1. A contaminated liquid filter apparatus comprising, a primary inlet and a primary outlet, a first bed of granular filter media between said primary inlet and primary outlet, a secondary inlet and secondary outlet, a second bed of granular filter media between said secondary inlet and secondary outlet, liquid transporting means connecting said primary outlet to said secondary inlet, said first bed and said second bed each including at least two vertically superimposed, distinct layers of granular filter media, the layers in each of said beds being intermixed along an interface to enhance particulate contaminant penetration into the lower media layers, means for supplying contaminated liquid to said primary inlet, said second bed being at least approximately twice as large as the first bed so that the flow rate through the first bed will be at least approximately twice as great as the flow rate through the second bed, and the average size of granules of filter media of each distinct layer being larger than the average size of granules of filter media of any successive layer in the direction of filtration flow.

2. The apparatus of claim 1 wherein the first bed includes a top layer of granulated shells of black walnuts in the size range of about −6 to +10 mesh, and a lower layer of granulated anthracite coal in the size range of about −8 to +16 mesh and said second bed includes a top layer of granulated anthracite coal in the size range of about −8 to +30 mesh and a lower layer of sand in the size range of about −30 to +40 mesh.

3. A contaminated liquid filter apparatus comprising, a primary inlet and primary outlet, a first bed of granular filter medium interposed between said primary inlet and primary outlet, a secondary inlet and secondary outlet, a second bed of granular media interposed between said secondary inlet and secondary outlet, a tertiary inlet and tertiary outlet, a third bed of granular filter media interposed between said tertiary inlet and tertiary outlet, liquid transporting means connecting said primary outlet to said secondary inlet, liquid transporting means connecting said secondary outlet to said tertiary inlet, said first bed including at least one distinct layer of granular filter medium, said second bed and third bed each including at least two distinct layers of granular filter media, the layers in said second and third bed being intermixed along an interface, means for supplying contaminated liquid to said primary inlet, said tertiary bed having a filtration cross-sectional area at least approximately three times greater than that of the first bed, and said secondary bed having a filtration cross-sectional area at least approximately twice as large as that of the first bed such that a greater flow rate is established through said first bed to cause larger contaminants to penetrate yet be retained by said first bed, and such that a reduced filtration flow rate is established through the successive beds to enable such beds to more efficiently entrap and retain smaller contaminants, and the average size of granules of filter media of each distinct layer being larger than the average size granules of filter media of a successive layer in the direction of filtration flow.

4. The apparatus of claim 3 wherein the first bed includes a layer of granulated anthracite coal in the size range of about three-sixteenth inch to five-sixteenth and the second bed in series includes a top layer of granulated black walnut shells in the size range of about −6 to +10 mesh and a lower layer of granulated anthracite coal in the size range of about −8 to +16 mesh and a third bed in series having a top layer of granulated anthracite coal in the size range of about −8 to +30 mesh and a lower layer of sand in the size range of about −30 to +30 mesh.

5. In a method of filtering, comprising the steps of:

flowing a contaminated liquid at a first flow rate through a first filter layer of substantially uniform graular medium size to obtain a partially filtered liquid flow, said first flow rate being sufficient to cause substantially all the particulate contaminants in said contaminated liquid to penetrate the inlet surface of said first filter layer to thereby minimize blinding off of the first layer by accumulation of contaminants at said inlet surface;

flowing the partially filtered liquid at said first flow rate successively through a first interface layer and a second medium layer, said second medium layer comprised of a substantially uniform granular medium size finer than that of said first filter layer, said interface layer comprised of a mixture of granules from both said first and second layers, said interface layer being in intimate contact with and between said first and second layers thereby reducing the accumulation of contaminants at the inlet surface of said second layer during filtration flow;

flowing the liquid from said second layer and through a third filter layer at a second flow rate less than said first flow rate, said first flow rate being at least approximately twice as great as said second flow rate, and said third filter layer being separated from said second layer and comprised of a substantially uniform size granular medium finer than said second layer granular medium;

flowing the liquid from said third layer successively through a second interface layer and a fourth filter medium layer at said second flow rate to generate a clarified liquid flow, said fourth medium layer comprised of a substantially uniform granular medium size finer than said third granular medium size, said second interface layer comprised of a mixture of granules from both said third and fourth medium layers and being between and in intimate contact with said third and fourth layer thereby reducing the accumulation of contaminants at the inlet surface of said second layer during filtration flow.

6. The method defined in claim 5, further including the step of flowing said contaminated liquid through an additional filter medium bed prior to flow through said first layer, the flow rate through said additional bed being greater than the flow rate through said first layer to cause substantially all the particulate contaminants in said contaminated liquid to penetrate the inlet surface of said additional bed to thereby minimize blinding off of the additional bed by accumulation of contaminants at said bed inlet surface, said additional bed being separated from said first layer and being comprised of a substantially uniform granular medium size coarser than the granular medium of said first filter layer to thereby remove flocculent-type and relatively large contaminants in said contaminated liquid.

7. In a method of filtering a contaminated liquid, the steps of:

1. flowing the contaminated liquid at a first flow rate through a first filter vessel containing at least two distinct, vertically superimposed layers of granular filter medium, said first flow rate being sufficient to cause substantially all of the contaminants to penetrate the first layer in a direction of filtration flow, said layers being intermixed along an interface to enhance particulate contaminant penetration into the second layer in the direction of filtration flow, and the granules of said first layer having an average size larger than the average size of the granules in said second layer;

2. subsequently flowing the liquid from said first vessel through at least two additional distinct, vertically superimposed layers of granular filter medium in a second filter vessel at a flow rate which is approximately only about one-half the flow rate through the first vessel to cause substantially all of the non-filtered contaminants to penetrate the first layer in the direction of filtration flow in the second vessel yet be entrapped within either said first or second additional layers, said additional layers being intermixed along an interface to enhance particulate contaminant penetration into the second additional bed in the direction of filtration flow, and the granules of said first additional layer having an average size smaller than the average particle size of the granules comprising the second layer in said first vessel but larger than the second layer in the second vessel;

3. rejuvenating the filter layers by introducing backwash liquid into each of said vessels in the opposite direction of filtration flow at a rate to expand said layers and remove a substantial portion of accumulated contaminants; and 4. reforming the distinct superimposed layers and intermixed interface regions in each vessel after backwashing.

* * * * *